(12) United States Patent
Nakai et al.

(10) Patent No.: US 6,887,111 B2
(45) Date of Patent: May 3, 2005

(54) ELECTRICAL/PHOTOELECTRIC CONVERSION DUAL CONNECTOR

(75) Inventors: Yuji Nakai, Sakai (JP); Yasuro Ishimori, Fujiidera (JP)

(73) Assignee: Hosiden Corporation, Osaka (JP)

( * ) Notice: Subject to any disclaimer, the term of this patent is extended or adjusted under 35 U.S.C. 154(b) by 0 days.

(21) Appl. No.: 10/325,992

(22) Filed: Dec. 19, 2002

(65) Prior Publication Data

US 2003/0119369 A1 Jun. 26, 2003

(30) Foreign Application Priority Data

Dec. 25, 2001 (JP) .................................... 2001-391493

(51) Int. Cl.[7] .............................................. H01R 17/00
(52) U.S. Cl. ...................................... 439/699; 385/88
(58) Field of Search ................................ 439/669, 668, 439/79, 947, 108, 188, 339, 577, 218, 83; 385/88, 92

(56) References Cited

U.S. PATENT DOCUMENTS

| | | | | |
|---|---|---|---|---|
| 4,547,039 A | * | 10/1985 | Caron et al. ................. | 385/88 |
| 5,325,454 A | * | 6/1994 | Rittle et al. ................... | 385/76 |
| 6,126,465 A | * | 10/2000 | Franks, Jr. .................. | 439/218 |
| 6,450,703 B1 | * | 9/2002 | Shirakawa ................... | 385/92 |
| 6,457,876 B1 | * | 10/2002 | Sawai ......................... | 385/92 |
| 6,500,026 B2 | * | 12/2002 | Yamaguchi ................. | 439/577 |
| 6,547,446 B2 | * | 4/2003 | Yamaguchi ................. | 385/53 |
| 6,558,045 B2 | * | 5/2003 | Yamaguchi ................. | 385/75 |
| 6,588,947 B2 | * | 7/2003 | Mine et al. .................. | 385/92 |

FOREIGN PATENT DOCUMENTS

JP      2-31735      8/1990

* cited by examiner

Primary Examiner—Ross Gushi
Assistant Examiner—Phuongchi Nguyen
(74) Attorney, Agent, or Firm—Koda & Androlia

(57) ABSTRACT

A dual connector including a first unit serving as the electrical connector element, and a second unit serving as the photoelectric conversion connector element which is attachable to and detachable from a rear end portion of the first unit. A first soldering terminal of the surface mount type disposed on the first unit is placed on a side portion of the body, and a second soldering terminal of the surface mount type disposed on the second unit is placed on a rear portion of a holder.

6 Claims, 16 Drawing Sheets

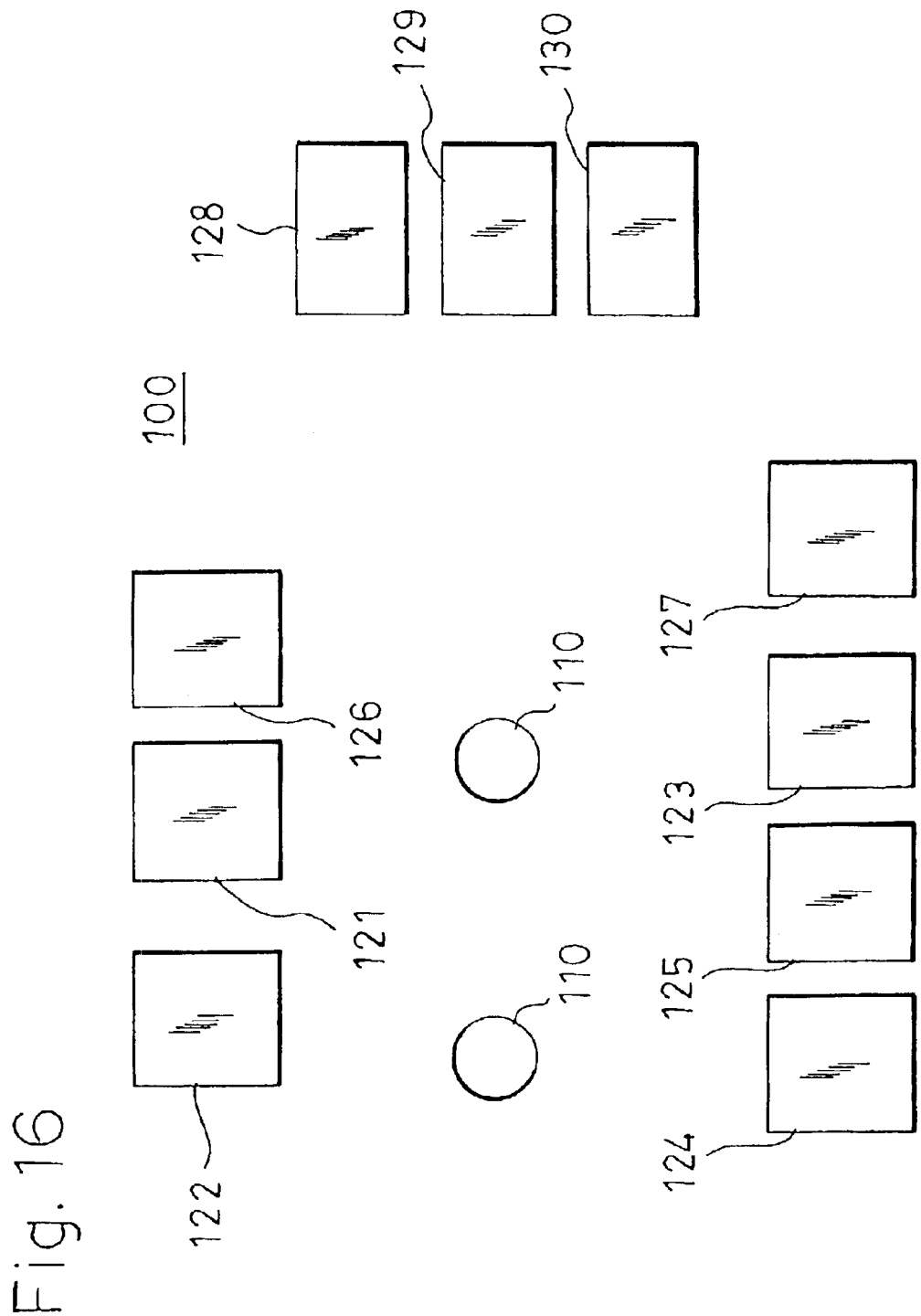

ELECTRICAL/PHOTOELECTRIC CONVERSION DUAL CONNECTOR

BACKGROUND OF THE INVENTION

1. Field of the Invention

The present invention relates to an electrical/photoelectric conversion dual connector.

2. Description of the Prior Art

As one of known examples, Japanese Utility Model Publication No. 2-31735 discloses a pin jack with an optical device. In the pin jack with an optical device, a pin type electrical plug and a pin type optical plug can be selectively inserted into and extracted from a through hole of the body which houses contacts, and a holding portion which has a photoelectric conversion device can be attached to and detached from a rear end portion of the body. Soldering terminals which downward protrude are formed on the body and the holding portion. When the pin jack is to be mounted to a wiring board, the soldering terminals are passed respectively through terminal holes of the wiring board and then soldered.

In a portable apparatus such as a portable telephone or a portable audio reproduction apparatus which has become largely widespread in recent years, an electrical/photoelectric conversion dual connector which can be used for both an electrical connection with a pin type electrical plug and an optical connection with a pin type optical plug is sometimes incorporated. In such a case, it is often advantageous that the connector is mounted in the state where soldering terminals do not protrude from the rear side of the wiring board, i.e., the surface mounted state in view of miniaturization and thinning of the portable apparatus. In some of electrical/photoelectric conversion dual connectors of this kind, as seen in the conventional art example described above, a photoelectric conversion connector element can be attached to and detached from an electrical connector element. In accordance with the function of the portable apparatus, such connectors are classified into those in which it is requested to incorporate only an electrical connector element, and those in which it is requested to incorporate both an electrical connector element and a photoelectric conversion connector element.

Under these circumstances, a configuration in which a wiring board for surface mounting only an electrical connector element, and that for surface mounting both an electrical connector element and a photoelectric conversion connector element must be individually produced is disadvantageous from the viewpoint of cost.

SUMMARY OF THE INVENTION

The invention has been conducted under such circumstances. It is an object of the invention to provide an electrical/photoelectric conversion dual connector in which the arrangement of surface mount type soldering terminals that are disposed on an electrical connector element and a photoelectric conversion connector element is improved so as to enable one wiring board to be used as that for surface mounting only an electrical connector element and also as that for surface mounting both an electrical connector element and a photoelectric conversion connector element, whereby the cost can be lowered.

It is another object of the invention to provide an electrical/photoelectric conversion dual connector in which an electrical connector element with which a photoelectric conversion connector element is to be combined is a multipolar one.

It is a further object of the invention to provide an electrical/photoelectric conversion dual connector in which a photoelectric conversion connector element can be correctly positioned with respect to an electrical connector element, so that both the elements can be surface mounted on a wiring board easily and adequately.

It is a still further object of the invention to provide an electrical/photoelectric conversion dual connector having a structure which can compensate strength reduction due to miniaturization to satisfy practical strength.

The electrical/photoelectric conversion dual connector of the invention comprises: a first unit serving as an electrical connector element having an insertion hole in a body into which a contact is incorporated, a pin type optical plug and a pin-type electrical plug being selectively insertable into and extractable from the insertion hole, the pin type optical plug holding an end portion of an optical fiber, the pin-type electrical plug having a terminal that is to be connected to the contact; and a second unit serving as a photoelectric conversion connector element comprising a holder which is attachable to and detachable from a rear end portion of the body of the first unit, and which holds a photoelectric conversion device that, in an attached state, is placed coaxially with an optical axis of the optical fiber held by the pin type optical plug inserted into the insertion hole.

Both the first and second units are formed as surface mounting type units, a first soldering terminal of a surface mount type disposed on the first unit is placed on a side portion of the body, and a second soldering terminal of the surface mount type disposed on the second unit is placed on a rear portion of the holder.

When the first soldering terminal of the first unit is placed on a side portion of the body and the second soldering terminal disposed on the second unit is placed on a rear portion of the holder as described above, a soldering land forming region on a wiring board can be divided into a region corresponding to the first soldering terminal, and that corresponding to the second soldering terminal. Therefore, a wiring board having a certain pattern of soldering lands can be used as a wiring board for surface mounting only an electrical connector element, and also as that for surface mounting both an electrical connector element and a photoelectric conversion connector element. This is useful for reducing the kinds of wiring boards to enable the cost to be easily reduced.

As a preferable mode, the electrical/photoelectric conversion dual connector of the invention may employ a configuration in which the first unit is a multipolar unit comprising a plurality of contacts and a plurality of the first soldering terminals which are continuous respectively to the contacts, part of the first soldering terminals is placed on one lateral side of the body, and other part of the first soldering terminals is placed on another lateral side of the body. According to the configuration, it is possible to provide an electrical/photoelectric conversion dual connector in which the electrical connector element with which the photoelectric conversion connector element is to be combined is a multipolar element.

As another preferable mode, in the electrical/photoelectric conversion dual connector of the invention, preferably, the holder comprises a pair of right and left arms which forward protrude to be longitudinally fittable into and extractable from the rear end portion of the body, and which, in a fitted state, overlap with right and left outer side faces of the rear end portion of the body, respectively, front end portions of the arms respectively comprise engaging claws which are to be engaged with engagement steps formed on right and left outer side faces of the body, to cooperate with a front end face of the holder to clampingly hold the rear end portion of the body, and a positioning protrusion is disposed integrally on the holder, the positioning protrusion being to be inserted into a recess formed in the rear end portion of the body to overlap with upper and lower wall faces of the recess, thereby restricting a level position of the second unit with respect to the first unit to make a level of a lower face of the second soldering terminal coincident with a level of a lower face of the first soldering terminal.

According to the configuration, the second unit is correctly positioned with respect to the first unit in the longitudinal, lateral, and vertical directions. Namely, the positioning of the second unit with respect to the first unit in the longitudinal direction is correctly performed by the clamping of the rear end portion of the body due to the cooperation of the front end face of the holder and the engaging claws engaged with the engagement steps. The positioning of the units in the lateral direction is correctly performed by the overlapping of the pair of arms forward protruding from the holder with the right and left outer side faces of the rear end portion of the body. The positioning of the units in the vertical direction is correctly performed by the overlapping of the positioning protrusion of the holder with the upper and lower wall faces of the recess of the body. Since the second unit is vertically positioned with respect to the first unit, the level of the lower face of the second soldering terminal is coincident with that of the lower face of the first soldering terminal, so that adequate soldering in the surface mounting process can be easily performed. Since the second unit is correctly positioned with respect to the first unit in the longitudinal, lateral, and vertical directions as described above, all of the first and second soldering terminals can be correctly placed on all of the soldering lands of the wiring board, respectively.

As a further preferable mode, in the invention, two or right and left portions of a wall face of the insertion hole in the rear end portion of the body are removed away, the recess is disposed in the rear end portion of the body and outside one of the removed portions with facing the one removed portion, another recess is disposed in the rear end portion of the body and outside another one of the removed portions with facing the other removed portion, the holder comprises an auxiliary protrusion which is to be inserted into the other recess to laterally oppose the positioning protrusion inserted into the recess, and each of the positioning and auxiliary protrusions comprises an arcuately curved face which forms a part of the wall face of the insertion hole in corresponding one of the removed portions. According to the configuration, the positioning and auxiliary protrusions of the second unit are useful for positioning a tip end portion of the pin type optical plug inserted into the insertion hole, with respect to a photoelectric conversion element of the second unit.

As a further preferable mode, in the invention, it is possible to employ a configuration in which the first unit comprises an odd number of first soldering terminals, the soldering terminals are classified into an even number of first soldering terminals and one first soldering terminal, the one first soldering terminal comprises a plate-like rising piece, and placed on a projection piece which rearward protrudes from one lateral side of the rear end portion of the body, the rising piece overlaps with an inner side of the projection piece, the even number of first soldering terminals are distributed by a same number to lateral sides of the body, and, when the second unit is attached to the first unit, an overlapping portion of the projection piece and the rising piece is fitted into a recess formed in an inner side of one of the arms of the holder.

According to the configuration, the second unit is laterally positioned with respect to the first unit by the fitting between the recess of the holder and the projection piece of the body which is fitted into the recess. Therefore, the positioning function exerted by the fitting assists the above-mentioned positioning function exerted by the overlapping of the pair of right and left arms with the right and left outer side faces of the body. Even in the case where the pair of right and left arms cannot be provided with high strength because the holder has a very small size, the positioning function by the fitting synergistically cooperates with that by the pair of right and left arms to surely laterally position the second unit with respect to the first unit. Moreover, the projection piece is reinforced by the rising piece which overlaps with the projection piece, and the overlapping portion of the projection piece and the rising piece is backed up by the arm. Even when a force of relatively moving the first and second units in a lateral direction is accidentally applied, therefore, a situation where the projection piece is easily broken can be prevented from occurring.

BRIEF DESCRIPTION OF THE DRAWINGS

FIG. 16 is a partial plan view of a wiring board showing an arrangement pattern of soldering lands.

DETAILED DESCRIPTION OF THE PREFERRED EMBODIMENT

Figure 1:
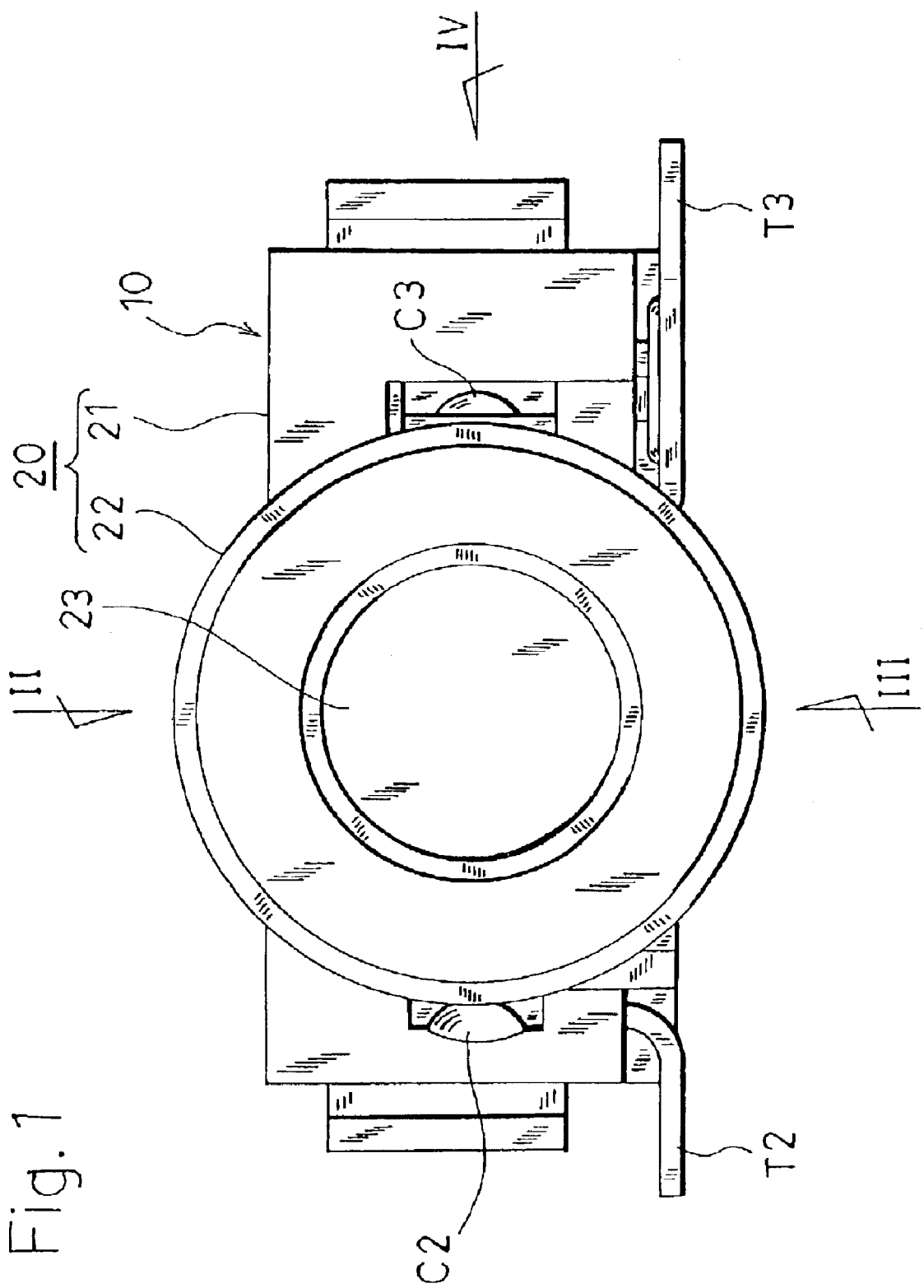
FIG. 1 is a front view of a first unit in an embodiment of the invention.
Figure 2:
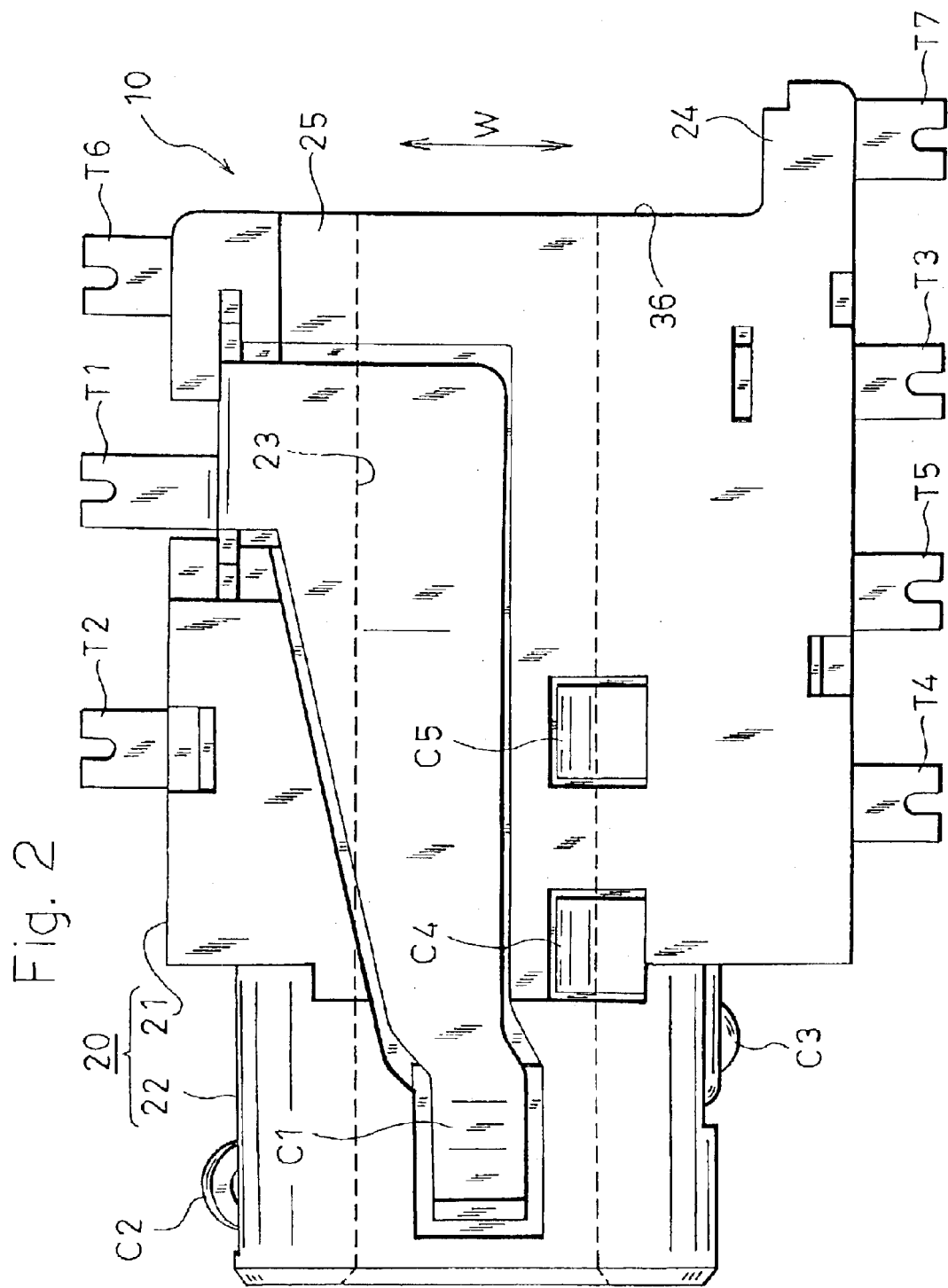
FIG. 2 is a view looking in the direction of the arrow II in FIG. 1.
Figure 3:
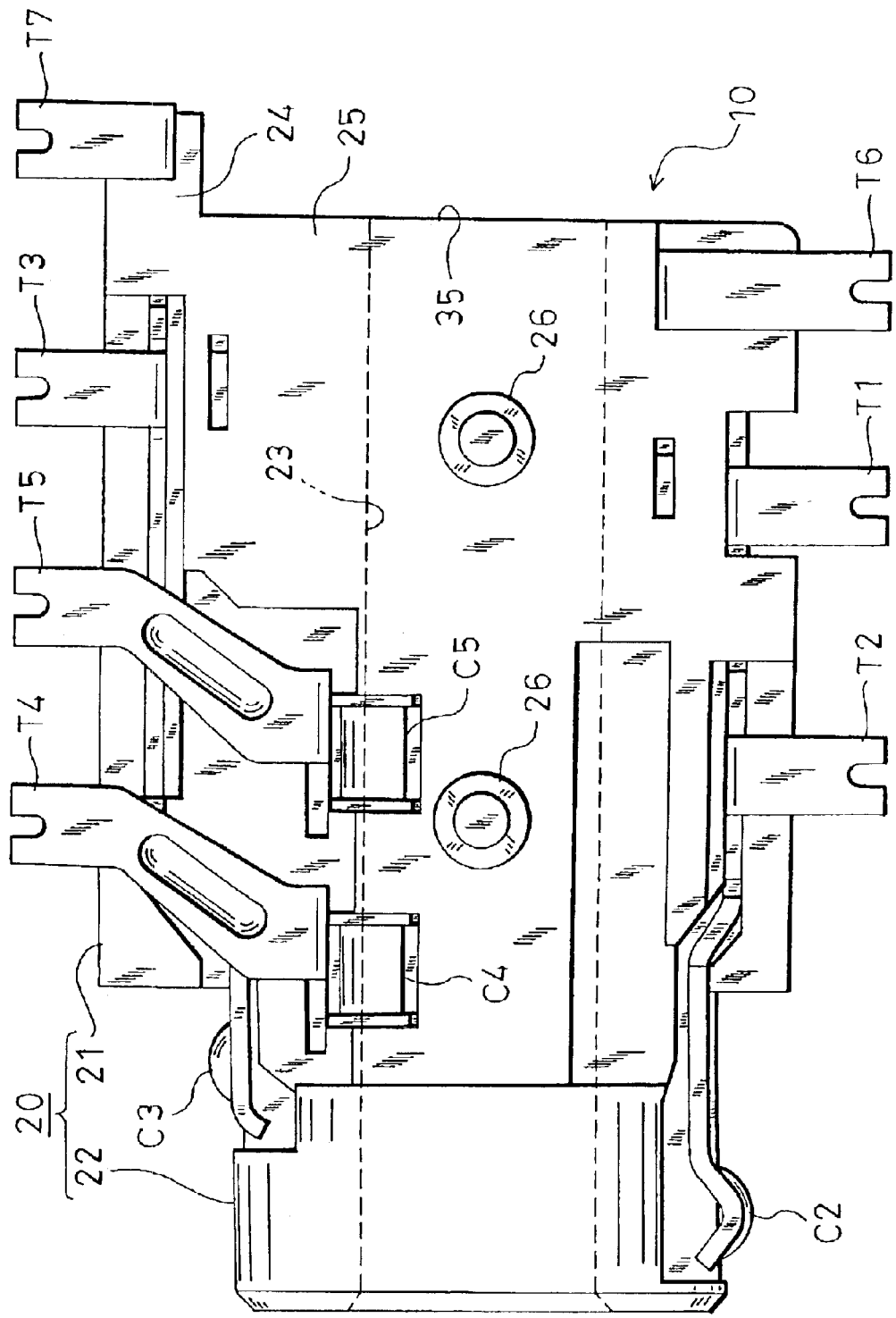
FIG. 3 is a view looking in the direction of the arrow III in FIG. 1.
Figure 4:
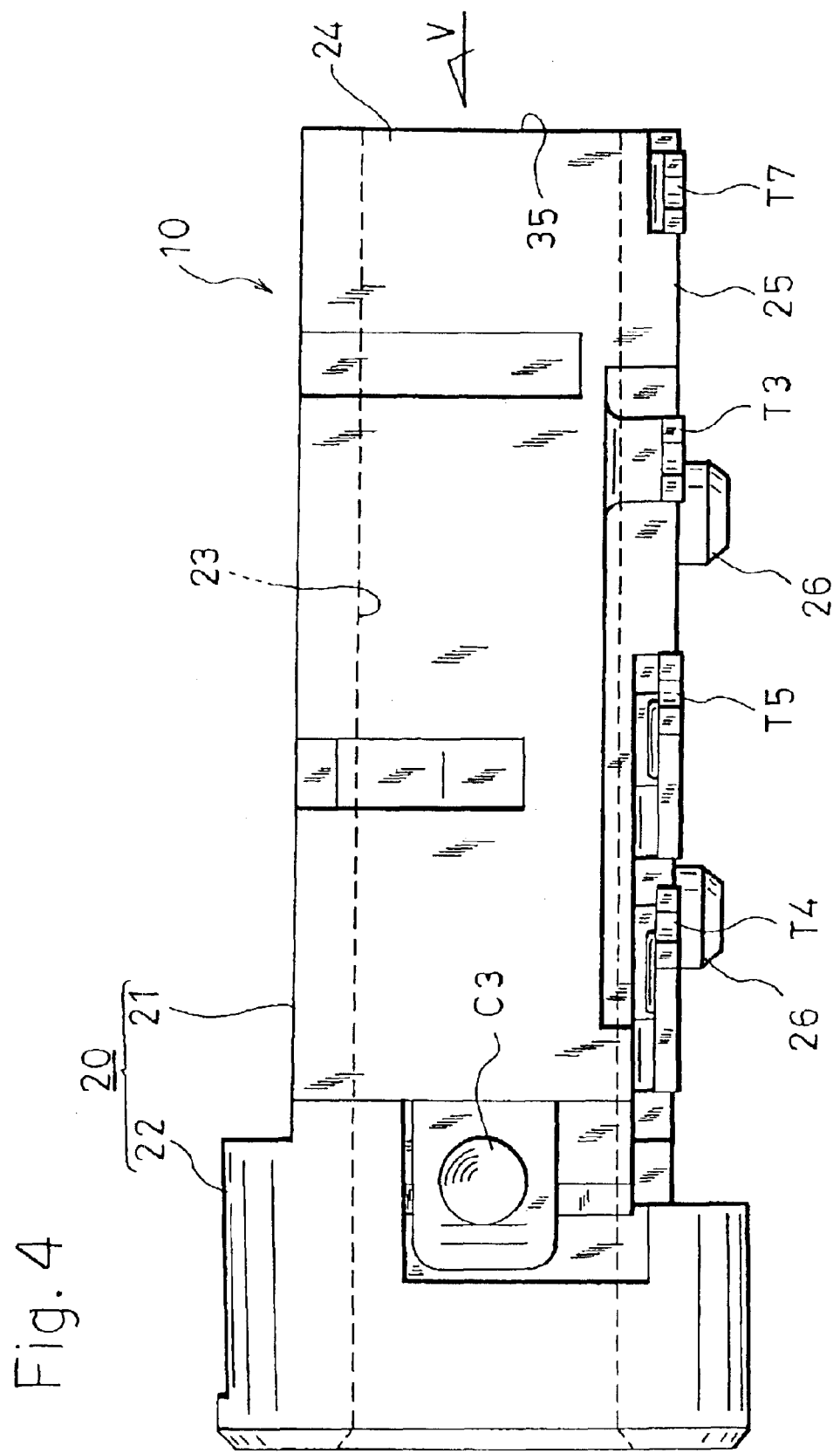
FIG. 4 is a view looking in the direction of the arrow IV in FIG. 1.

FIGS. 1 to 5 show a first unit 10 serving as an electrical connector element which is used in an electrical/ photoelectric conversion dual connector of an embodiment of the invention.

The first unit 10 is a multipolar connector element in which a plurality of contacts are incorporated into a body 20 configured by an integrally molded member of a synthetic resin having: a body main portion 21 that is formed into a box-like shape having a rectangular shape in a plan view; and a cylindrical boss portion 22 that forward protrudes from the body main portion 21. A circular insertion hole 23 is straightly formed so as to elongate over the boss portion 22 and the body main portion 21. A pin type electrical plug and a pin type optical plug which are not shown can be selectively inserted into and extracted from the insertion hole 23.

Figure 5:
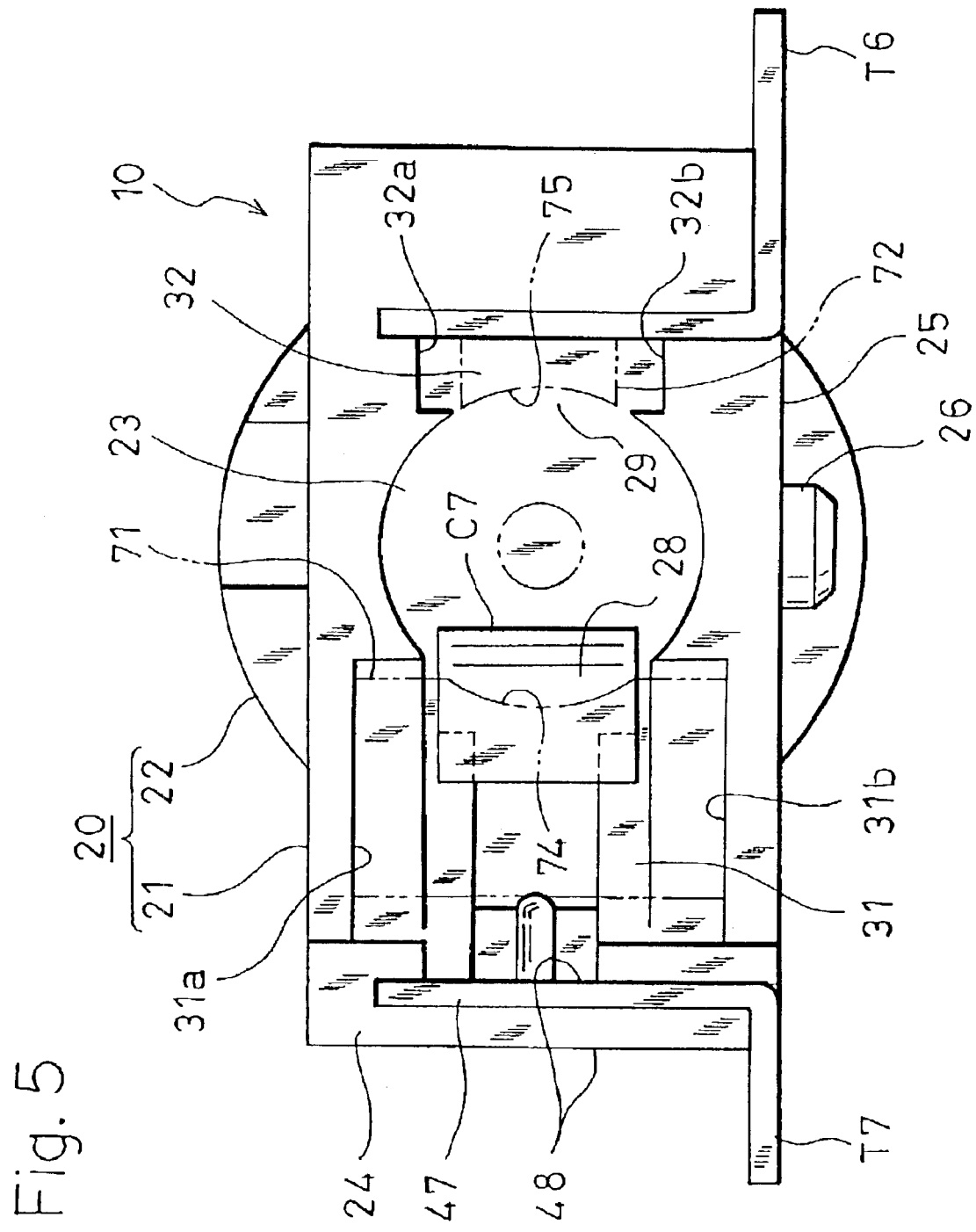
FIG. 5 is a view looking in the direction of the arrow V in FIG. 4.
Figure 15:
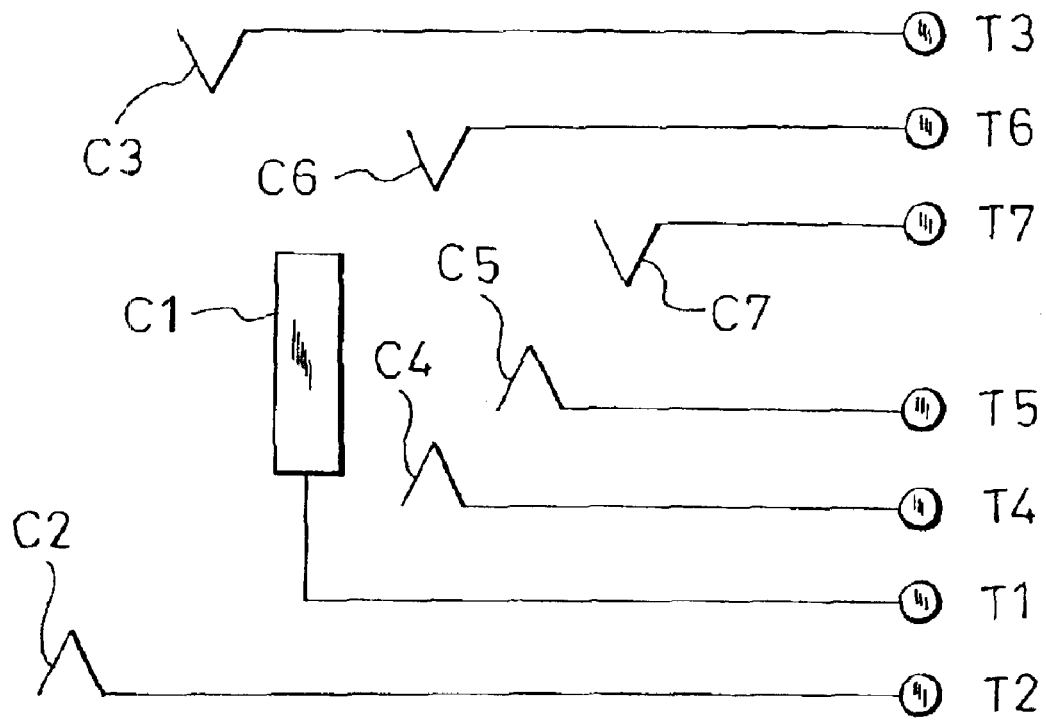
FIG. 15 is a circuit diagram of an electric circuit in the first unit.

FIG. 15 is a circuit diagram of an electric circuit in the first unit 10. As shown in the figure, the first unit 10 has seven contacts C1 to C7 constituting seven poles. First soldering terminals T1 to T7 are continuous respectively to the contacts C1 to C7. As can be inferred from FIGS. 1 to 5, the three front contacts C1 to C3 are disposed by using the boss portion 22, and the four rear contacts C4 to C7 are disposed on the body main portion 21. Among the seven (odd number of) first soldering terminals T1 to T7, the six (even number of) first soldering terminals T1 to T6 which are continuous respectively to the contacts C1 to C6 are distributed by the same number or three to the one and other sides in the lateral direction W (FIG. 2) of the body main portion 21. As shown in FIG. 5, the remaining one first soldering terminal T7 is placed on a projection piece 24 which rearward protrudes from one side in the lateral direction W of a rear end portion of the body main portion 21, and a plate-like rising piece 47 which is disposed on the first soldering terminal T7 overlaps with the inner side of the projection piece 24.

The soldering terminals T1 to T6 which are disposed by three on each of the right and left sides of the body main portion 21 protrude in a plate piece-like manner toward the outer side of the body main portion 21 so that the lower faces of the terminals are substantially flush with the flat lower face of the body main portion 21. By contrast, the remaining one soldering terminal T7 protrudes toward the outer side from the lower end of the projection piece 24, and the level of the lower face of the terminal is coincident with the levels of the lower faces of the other six soldering terminals T1 to T6. Since the lower faces of the seven soldering terminals T1 to T7 are in the same level, the soldering terminals T1 to T7 can be used as terminals of a surface mounting type device. A positioning protrusion 26 is disposed in each of two or front and rear positions of the lower face 25 of the body main portion 21. When the protrusions 26 are fitted into two positioning holes 110 of a wiring board 100 which will be described later, the mounting position of the connector on the wiring board 100 can be determined (see FIG. 16).

As seen from FIG. 5, two portions of the insertion hole 23 in the rear end portion of the body main portion 21 are removed away, and right and left individual recesses 31 and 32 are disposed outside the right and left removed portions 28 and 29, respectively. The contact C7 which is continuous to the rising piece 47 protrudes so as to cross the one recess 31. Upper and lower wall faces 31a, 31b, 32a, and 32b of the right and left recesses 31 and 32 are formed as flat faces.

FIG. 16 is a partial plan view of the wiring board 100 to which the first unit 10 is to be surface mounted. As shown in the figure, the positioning holes 110 into which the two positioning protrusions 26 of the first unit 10 are fitted are opened in the wiring board 100. A total of seven soldering lands 121 to 127 are formed so as to be distributed on both the sides of the positioning holes 110. The soldering lands 121 to 127 are formed in positions where, when the positioning protrusions 26 of the first unit 10 are fitted into the positioning holes 110, the seven soldering terminals T1 to T7 of the first unit 10 overlap with the lands, respectively. Therefore, the first unit 10 can be surface mounted to the wiring board 100 in the following manner. The positioning protrusions 26 are fitted into the positioning holes 110, so that the flat lower face 25 of the body main portion 21 overlaps with the wiring board 100 and the seven soldering terminals T1 to T7 overlap with the seven soldering lands 121 to 127, respectively. Thereafter, the overlapping portions are soldered.

When a pin type electrical plug is inserted into the insertion hole 23 of the first unit 10 which is surface mounted to the wiring board 100 as described above, the contacts C1 to C7 of the body 20 are elastically in contact with plural terminals of the pin type electrical plug to attain electrical conduction, respectively.

Figure 6:
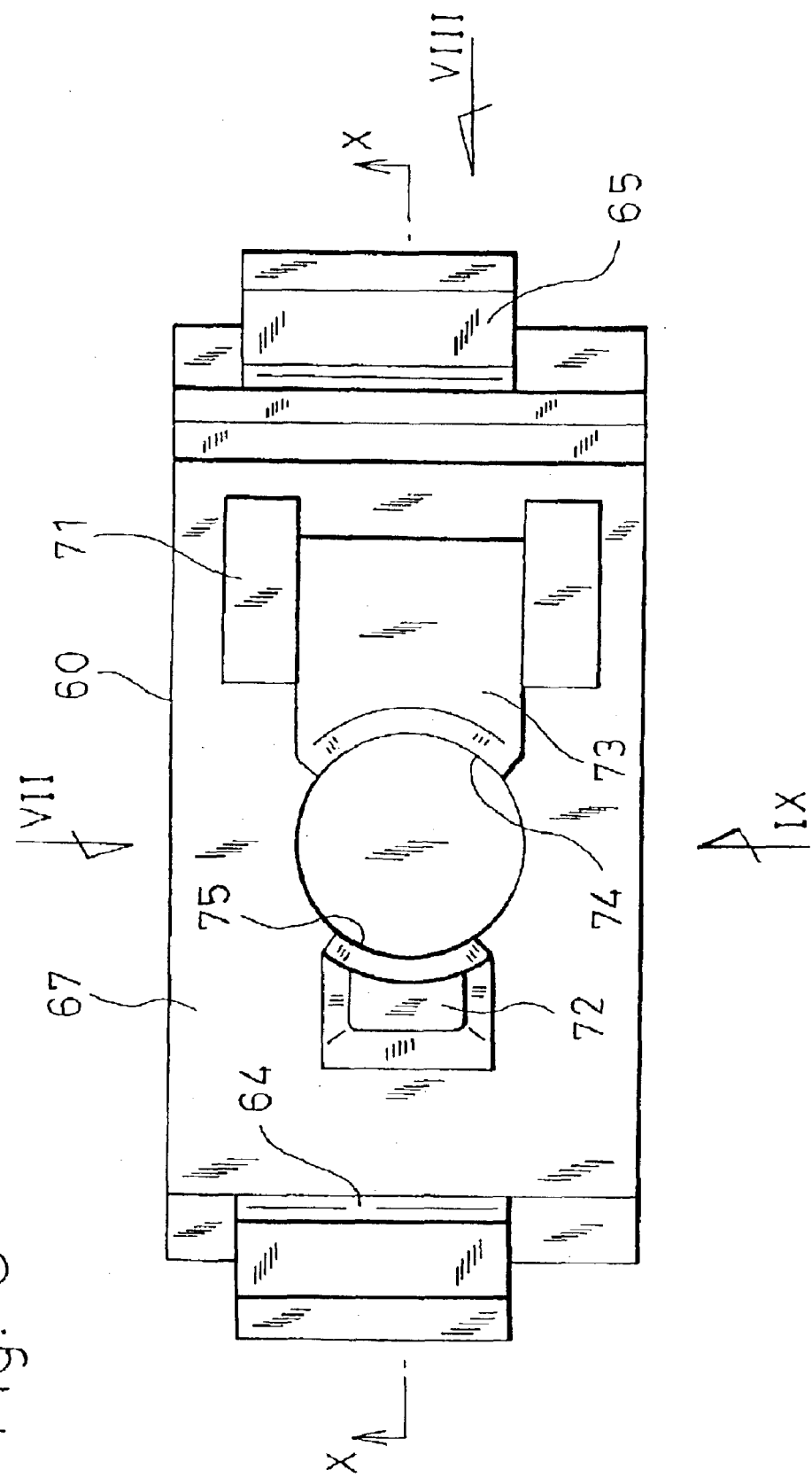
FIG. 6 is a front view of a holder of a second unit in the embodiment of the invention.
Figure 7:
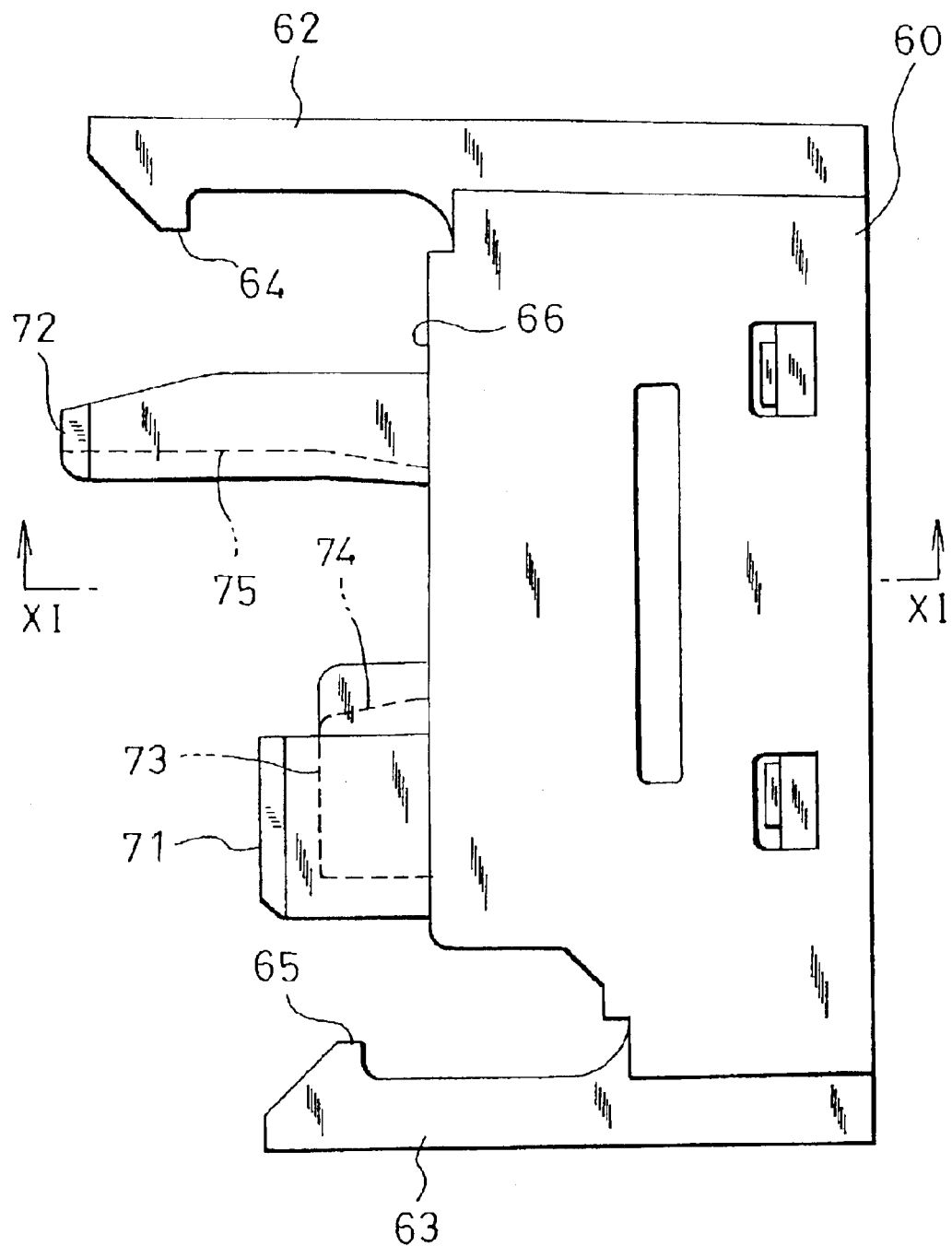
FIG. 7 is a view looking in the direction of the arrow VII in FIG. 6.
Figure 8:
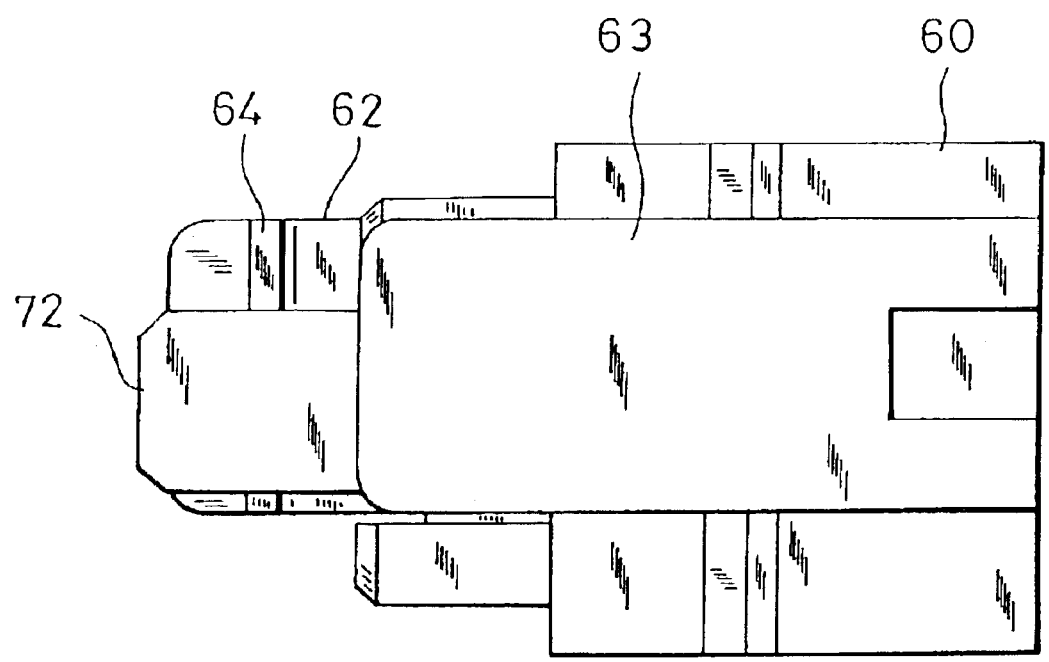
FIG. 8 is a view looking in the direction of the arrow VIII in FIG. 6.
Figure 9:
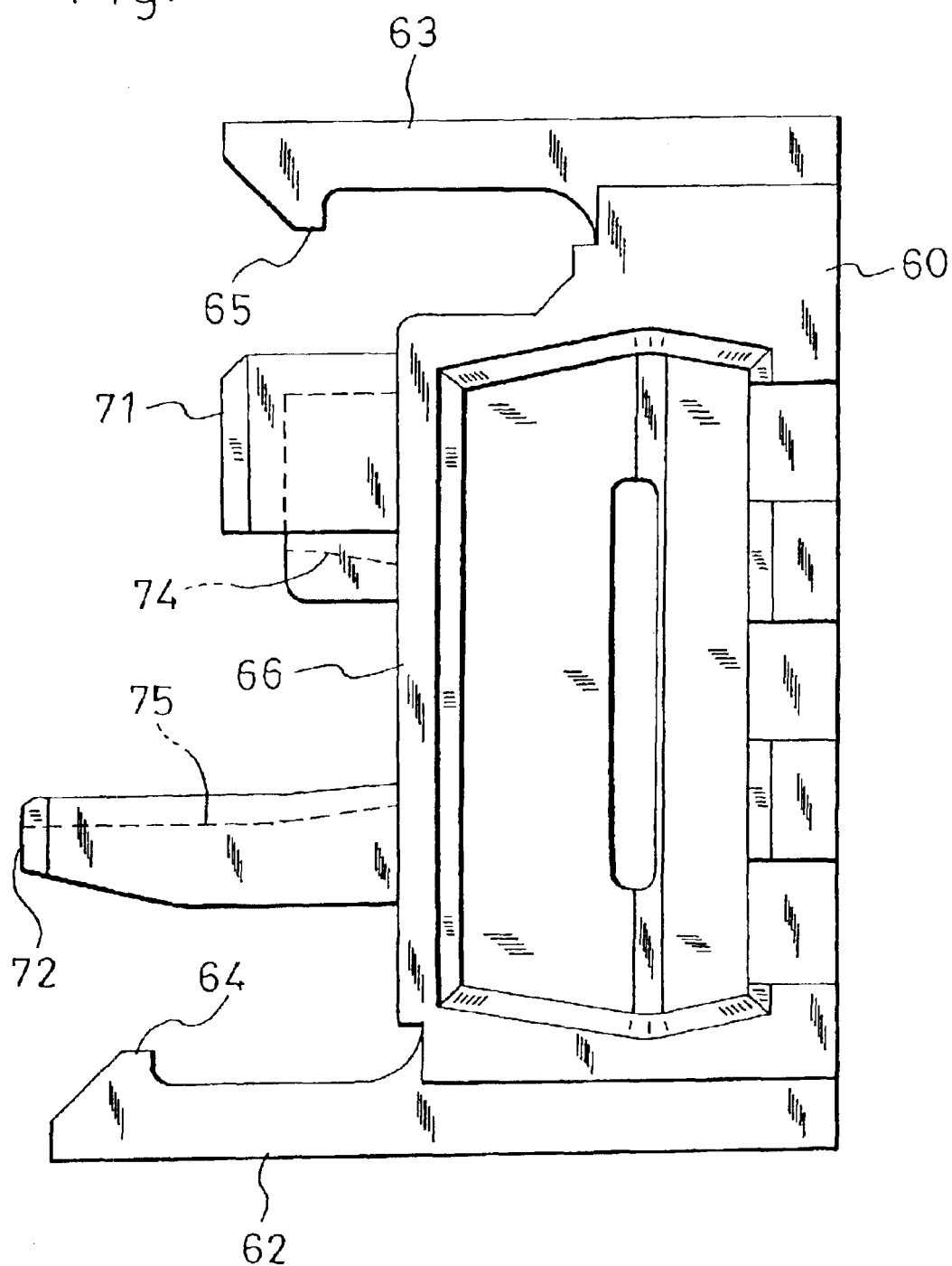
FIG. 9 is a view looking in the direction of the arrow IX in FIG. 6.
Figure 10:
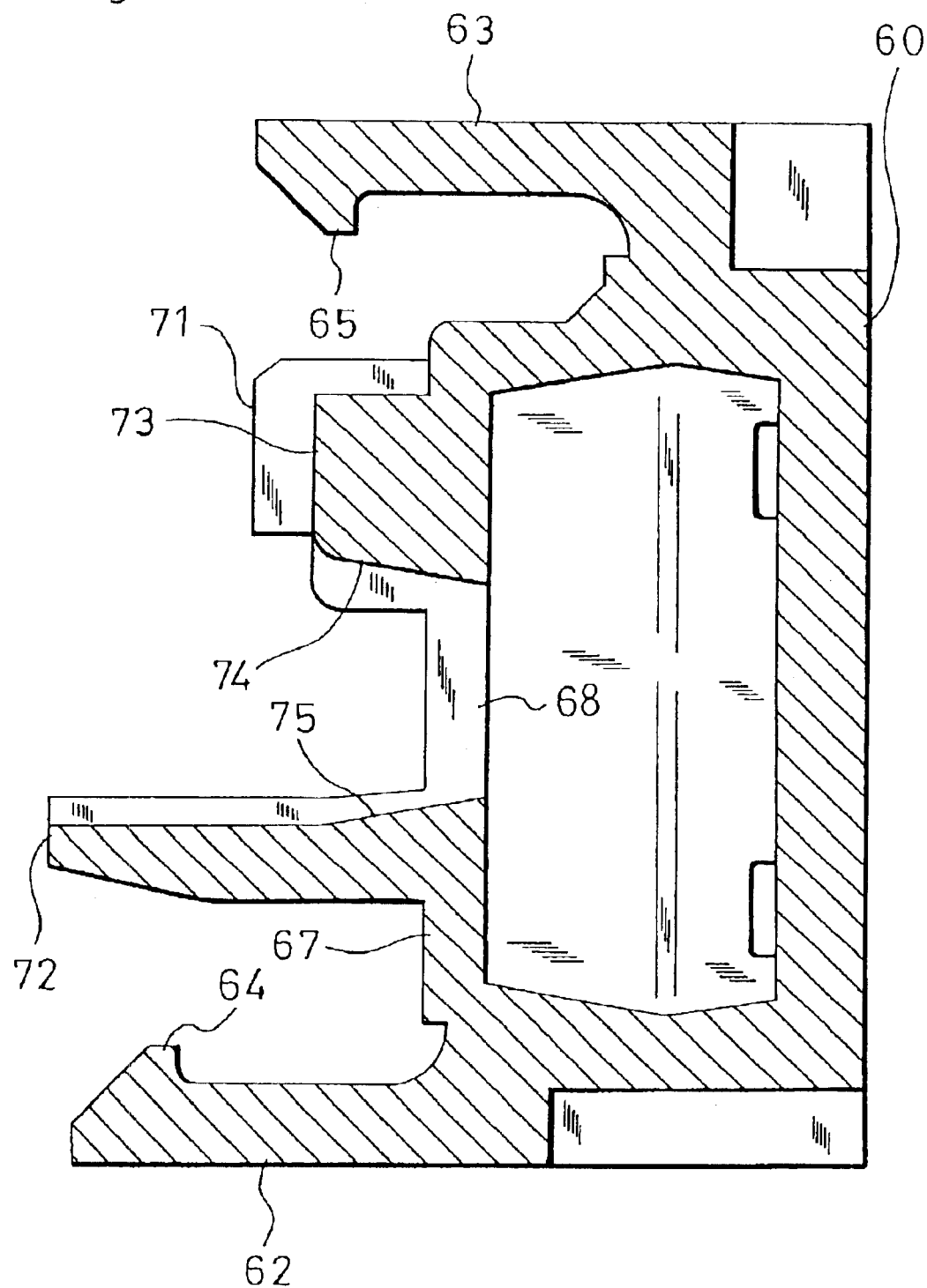
FIG. 10 is a section view taken along the line X—X in FIG. 6.
Figure 11:
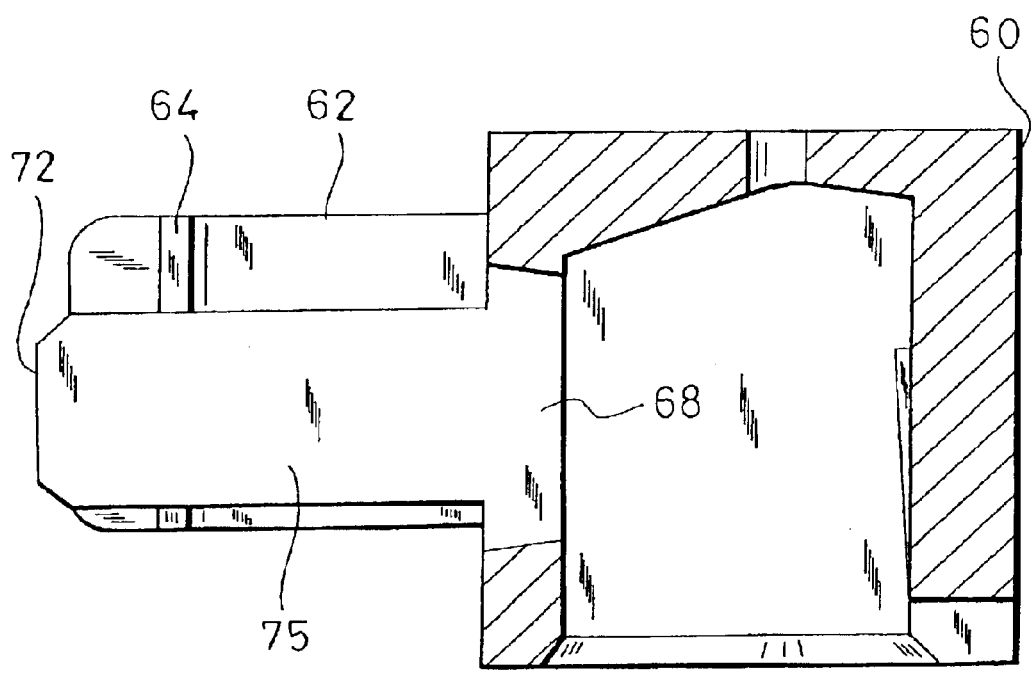
FIG. 11 is a section view taken along the line XI—XI in FIG. 7.
Figure 12:
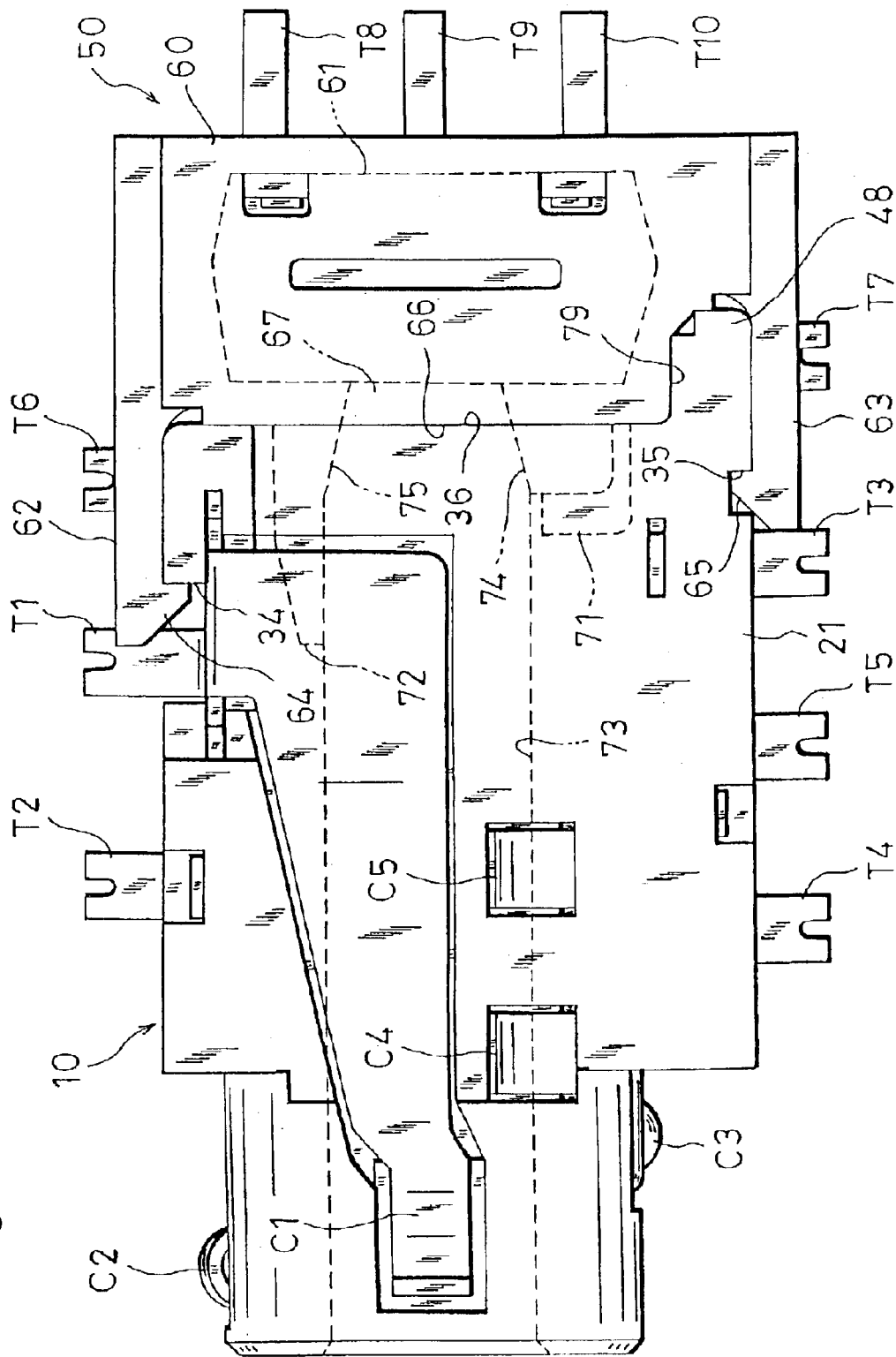
FIG. 12 is a plan view of an electrical/photoelectric conversion dual connector of the embodiment of the invention.
Figure 13:
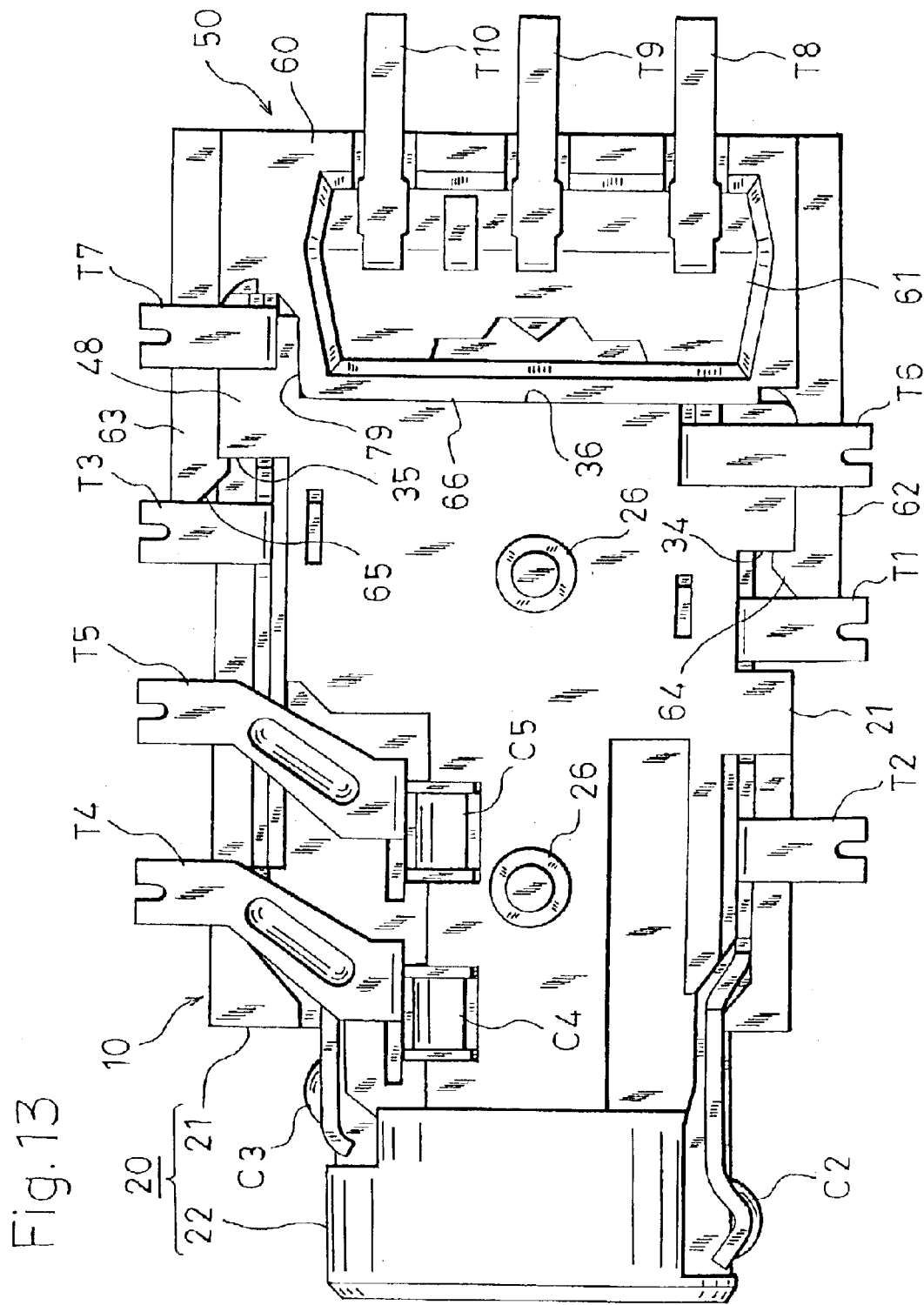
FIG. 13 is a bottom view of the electrical/photoelectric conversion dual connector.
Figure 14:
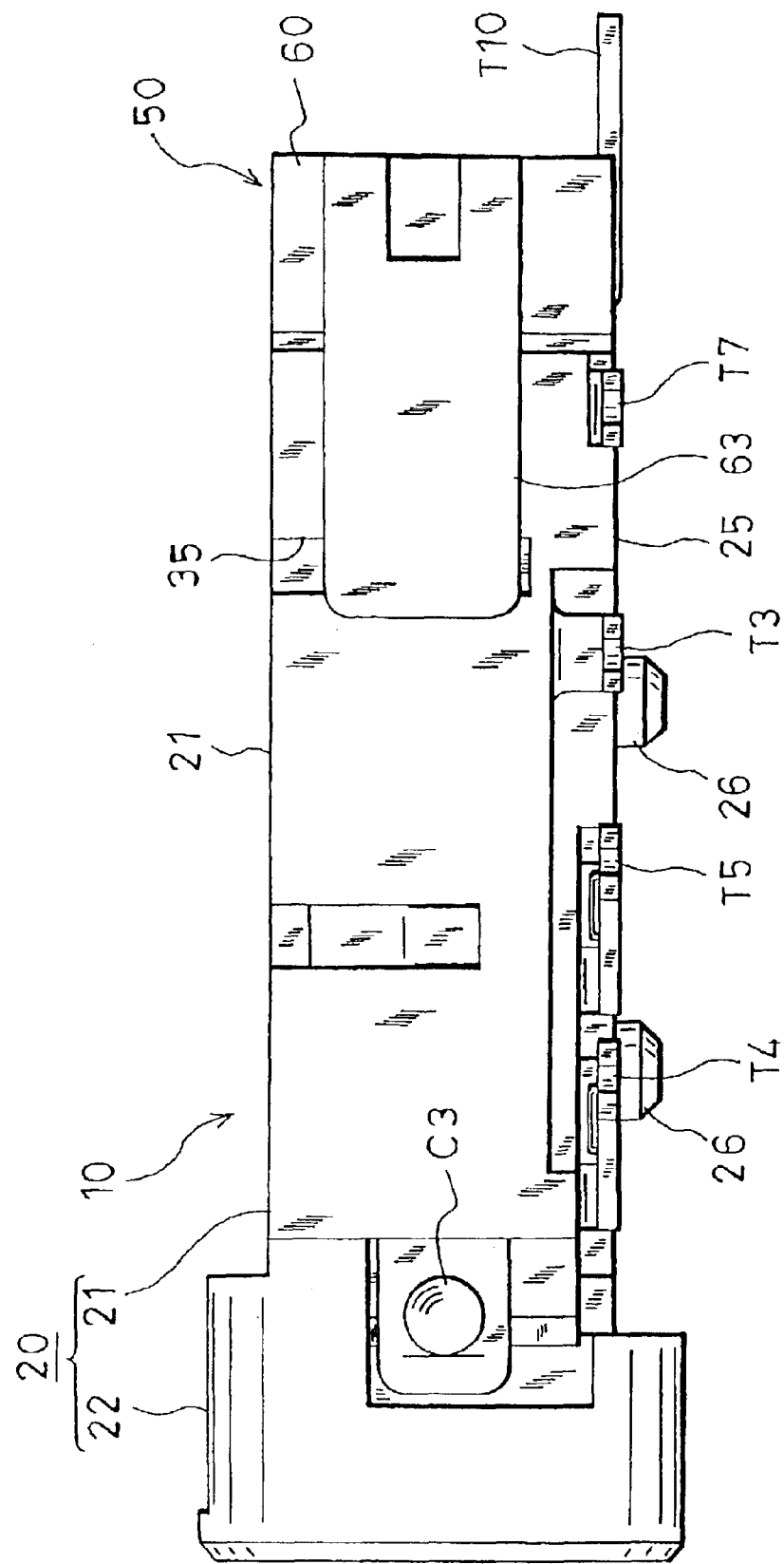
FIG. 14 is a side view of the electrical/photoelectric conversion dual connector.

FIGS. 6 to 11 show a holder 60 of a second unit 50 serving as a photoelectric conversion connector element which is used in the electrical/photoelectric conversion dual connector of the embodiment of the invention. FIG. 6 is a front view, FIG. 7 is a view looking in the direction of the arrow VII in FIG. 6, FIG. 8 is a view looking in the direction of the arrow VIII in FIG. 6, FIG. 9 is a view looking in the direction of the arrow IX in FIG. 6, FIG. 10 is a section view taken along the line X—X in FIG. 6, and FIG. 11 is a section view taken along the line XI—XI in FIG. 7. FIG. 12 is a plan view of the electrical/photoelectric conversion dual connector A in which the second unit 50 is attached to the first unit 10, FIG. 13 is a bottom view of the electrical/photoelectric conversion dual connector A, and FIG. 14 is a side view of the electrical/photoelectric conversion dual connector A.

As shown in FIG. 7 or 11, the holder 60 is formed into a hollow box-like shape having an opened lower face. A photoelectric conversion element 61 is housed and held in the holder as shown in FIG. 13, thereby forming the second unit 50. As shown in FIG. 6, 10, or 11, a circular opening 68 is formed in a front wall 67 of the holder 60. As shown in FIG. 12, the photoelectric conversion element 61 which is housed and held in the holder 60 faces the opening 68.

A pair of right and left arms 62 and 63 which forward protrude are disposed on the holder 60. In the state where the second unit 50 is attached to the first unit 10, as shown in FIG. 12 or 13, the arms 62 and 63 are fitted onto the outer side of the rear end portion of the body main portion 21 of the first unit 10 to overlap with the right and left outer side faces of the rear end portion of the body main portion 21. As shown in FIG. 12 or 14, engaging claws 64 and 65 which are disposed on front end portions of the arms 62 and 63 are engaged with channel-like engagement steps 34 and 35 formed on right and left outer side faces of the rear end portion of the body main portion 21, respectively, so that a front end face 66 (the front wall 67) of the holder 60 butts against a rear end face 36 of the body main portion 21. When the second unit 50 is attached to the first unit 10, therefore, the rear end portion of the body main portion 21 is clampingly held by the cooperation of the front end face 66 of the holder 60 and the engaging claws 64 and 65.

As shown in FIG. 6 or 10, a positioning protrusion 71 protrudes from one side of the front wall 67 of the holder 60 with respect to the opening 68, and an auxiliary protrusion 72 protrudes from the other side. A recess 73 is formed in a front end portion of the positioning protrusion 71. The inner face of the positioning protrusion is formed as an arcuately curved face 74 which is forward flared and continuous to the peripheral face of the opening 68. Also the inner face of the auxiliary protrusion 72 is formed as an arcuately curved face 75 which is forward flared and continuous to the peripheral face of the opening 68. In the state where the second unit 50 is attached to the first unit 10, as shown by the phantom lines in FIG. 5 showing the first unit 10, the positioning protrusion 71 is inserted into the recess 31 of the body main portion 21 to overlap with the upper and lower wall faces 31a and 31b of the recess 31, thereby restricting the level position of the second unit 50 with respect to the first unit 10, and the curved face 74 of the positioning protrusion 71 faces the one removed portion 28 of the insertion hole 23 to form a part of the wall face of the insertion hole 23. The contact C7 is to be fitted into the recess 73 of the positioning protrusion 71. By contrast, the auxiliary protrusion 72 is inserted into the other recess 32, so that the protrusion laterally opposes the positioning protrusion 71 across the insertion hole 23, and the curved face 75 of the auxiliary protrusion 72 faces the other removed portion 29 of the insertion hole 23 to form a part of the wall face of the insertion hole 23. An overlapping portion 48 (see FIG. 5) of the projection piece 24 of the first unit 10 and the rising piece 47 is fitted into a recess 79 formed in the inner side of the one arm 63 of the holder 60 as shown in FIG. 12 or 13.

As shown in FIGS. 12 to 14, the photoelectric conversion element 61 comprises three second soldering terminals T8, T9, and T10. The soldering terminals T8 to T10 are placed on a rear portion of the holder 60 with rearward protruding from the lower end edge of the holder 60. Since the positioning protrusion 71 overlaps with the upper and lower wall faces 31a and 31b of the recess 31 of the body main portion 21 to restrict the level position of the second unit 50 with respect to the first unit 10, the levels of the lower faces of the soldering terminals T8 to T10 are coincident with those of the lower faces of the first soldering terminals T1 to T7. In this way, the lower faces of the seven soldering terminals T1 to T7 of the first unit 10 and the three soldering terminals TB to T10 of the second unit 50 are in the same level, all the soldering terminals T1 to T10 can be used as terminals of a surface mounting type device in the state where the second unit 50 is attached to the first unit 10.

As shown in FIG. 16, soldering lands 128 to 130 respectively corresponding to the three soldering terminals T8 to T10 of the second unit 50 are formed on the wiring board 100 on which the soldering lands 121 to 127 corresponding to the seven soldering terminals T1 to T7 of the first unit 10 are formed.

Next, the operation will be described.

In the case where the electrical/photoelectric conversion dual connector is requested to exert only the function of an electrical connector and not to exert that of a photoelectric conversion connector, the second unit 50 is omitted, and only the first unit 10 is surface mounted to the wiring board 100 as described above. As a result, when a pin type electrical plug is inserted into the insertion hole 23 of the first unit 10, the contacts C1 to C7 of the body 20 are elastically in contact with plural terminals of the pin type electrical plug to attain electrical conduction and exert only the function of an electrical connector, respectively.

By contrast, in the case where the connector is requested to exert both the functions of an electrical connector and a photoelectric conversion connector, the second unit 50 is attached to the first unit 10, and both the units 10 and 50 are surface mounted to the wiring board 100. The second unit 50 can be attached to the first unit 10 in a procedure in which the second unit 50 is attached to the first unit 10 before the surface mounting, and the units 10 and 50 are then surface mounted, or in another procedure in which the first unit 10 is surface mounted to the wiring board 100, the second unit 50 is then attached to the first unit 10, and a process of surface mounting the second unit 50 is thereafter performed.

The second unit 50 is attached to the first unit 10 in the following manner. The pair of right and left arms 62 and 63 of the second unit 50 are fitted from the rear side of the first unit 10 to the outer side of the rear end portion of the body main portion 21 of the first unit, and the engaging claws 64 and 65 of the arms 62 and 63 are engaged with the engagement steps 34 and 35 of the body main portion 21, so that the rear end portion of the body main portion 21 is clampingly held by the cooperation of the front end face 66 of the holder 60 and the engaging claws 64 and 65. As a result, the positioning protrusion 71 of the second unit 50 is fitted into the one recess 31 of the body main portion 21 to overlap with the upper and lower wall faces 31a and 31b of the recess, and hence the level position of the second unit 50 with respect to the first unit 10 is restricted to make the levels of the lower faces of the second soldering terminals T8 to T10 coincident with those of the lower faces of the first soldering terminals T1 to T7. Irrespective of which one of the procedures is employed, therefore, the first soldering terminals T1 to T7 and the second soldering terminals T8 to T10 can be soldered easily and adequately to the soldering lands 121 to 127 and 128 to 130 of the wiring board 100, to allow the first unit 10 and the second unit 50 to be easily surface mounted.

In the case where the first unit 10 and the second unit 50 are surface mounted to the wiring board 100 in this way, when a pin type electrical plug is inserted into the insertion hole 23 of the first unit 10, the contacts C1 to C7 of the body 20 are elastically in contact with plural terminals of the pin type electrical plug to attain electrical conduction, whereby the function of an electrical connector is exerted. When a pin type optical plug (not shown) is inserted into the insertion hole 23 of the first unit 10, the optical axis of an optical fiber held in the pin type optical plug is placed coaxially with the photoelectric conversion element 61 of the second unit 50, and hence the pin type optical plug is optically connected to the photoelectric conversion element 61 of the second unit 50, whereby the function of a photoelectric conversion connector is exerted.

In this case, the positioning of the second unit 50 with respect to the first unit 10 in the longitudinal direction is correctly performed by the clamping of the rear end portion of the body main portion 21 due to the cooperation of the front end face 66 of the holder 60 and the engaging claws 64 and 65 engaged with the engagement steps 34 and 35. The positioning of the units in the lateral direction is correctly performed by the overlapping of the pair of right and left arms 62 and 63 of the holder 60 with the right and left outer side faces of the rear end portion of the body main portion 21. The positioning of the units in the vertical direction is correctly performed by the overlapping of the positioning protrusion 71 of the holder 60 with the upper and lower wall faces 31a and 31b of the one recess 31 of the body main portion 21. Therefore, the optical axis of the optical fiber held in the pin type optical plug which is inserted into the insertion hole 23 of the first unit 10 is correctly placed coaxially with the photoelectric conversion element 61 of the second unit 50. This is useful for preventing the function of a photoelectric conversion connector from being lost. Since the curved face 74 of the positioning protrusion 71 and the curved face 75 of the auxiliary protrusion 72 form a part of the wall face of the insertion hole 23 in the two right and left removed portions of the insertion hole 23, the pin type optical plug is allowed to be easily held to an adequate position, by the positioning function exerted by the curved faces 74 and 75. This is useful also for preventing the function of a photoelectric conversion connector from being lost.

As shown in FIG. 12 or 13, the overlapping portion 48 of the projection piece 24 of the first unit 10 and the rising piece 47 is fitted into the recess 79 formed in the inner side of the one arm 63 of the holder 60, thereby producing a state where the overlapping portion 48 is backed up by the arm 63. Even when a pin type electrical plug or a pin type optical plug is elastically in contact with the contact C7 which is continuous to the rising piece 47 of the overlapping portion 48 to elastically press the rising piece 47 in a lateral direction, therefore, the projection piece 24 of the overlapping portion 48 is not deformed nor broken.

The invention can be embodied in various other manners without departing the spirit or principal features of the invention. The embodiment described above is a mere exemplification in every respect, and is not restrictively construed. The scope of the invention is to be determined solely by the appended claims, and not limited by the description of the specification. All modifications and changes belonging to the range of equivalence of the appended claims are within the scope of the invention.

The entire disclosure of Japanese Patent Application No. 2001-391493 filed on Dec. 25, 2001 including specification, claims, drawings and summary are incorporated herein by reference in its entirety.

What is claimed is:

1. An electrical/photoelectric conversion dual connector comprising: a first unit serving as an electrical connector element having an insertion hole in a body into which a contact is incorporated, a pin type optical plug and a pin-type electrical plug being selectively insertable into and extractable from said insertion hole, said pin type optical plug holding an end portion of an optical fiber, said pin-type electrical plug having a terminal that is to be connected to said contact; and a second unit serving as a photoelectric conversion connector element comprising a holder which is attachable to and detachable from a rear end portion of said body of said first unit, and which holds a photoelectric conversion device that, in an attached state, is placed coaxially with an optical axis of said optical fiber held by said pin type optical plug inserted into said insertion hole, wherein both said first and second units are formed as surface mounting type units, a first soldering terminal of a surface mount type disposed on said first unit is placed on a side portion of said body, and a second soldering terminal of the surface mount type disposed on said second unit is placed on a rear portion of said holder; and said holder comprises a pair of right and left arms which forward protrude to be longitudinally fittable into and extractable from said rear end portion of said body, and which, in a fitted state, overlap with right and left outer side faces of said rear end portion of said body, respectively, front end portions of said arms respectively comprise engaging claws which are to be engaged with engagement steps formed on right and left outer side faces of said body, to cooperate with a front end face of said holder to clampingly hold said rear end portion of said body, and a positioning protrusion is disposed integrally on said holder, said positioning protrusion being to be inserted into a recess formed in said rear end portion of said body to overlap with upper and lower wall faces of said recess, thereby restricting a level position of said second unit with respect to said first unit to make a level of a lower face of said second soldering terminal coincident with a level of a lower face of said soldering terminal.

2. An electrical/photoelectric conversion dual connector according to claim 1, wherein two or right and left portions of a wall face of said insertion hole in said rear end portion of said body are removed away, said recess is disposed in said rear end portion of said body and outside one of said removed portions with facing said one removed portion, another recess is disposed in said rear end portion of said body and outside another one of said removed portions with facing said other removed portion, said holder comprises an auxiliary protrusion which is to be inserted into said other recess to laterally oppose said positioning protrusion inserted into said recess, across said insertion hole, and each of said positioning and auxiliary protrusions comprises an arcuately curved face which forms a part of said wall face of said insertion hole in corresponding one of said removed portions.

3. An electrical/photoelectric conversion dual connector according to claim 2, wherein said first unit comprises an odd number of first soldering terminals, said soldering terminals are classified into an even number of first soldering terminals and one first soldering terminal, said one first soldering terminal comprises a plate-like rising piece, and placed on a projection piece which rearward protrudes from one lateral side of said rear end portion of said body, said rising piece overlaps with an inner side of said projection piece, said even number of first soldering terminals are distributed by a same number to lateral sides of said body, and, when said second unit is attached to said first unit, an overlapping portion of said projection piece and said rising piece is fitted into a recess formed in an inner side of one of said arms of said holder.

4. An electrical/photoelectric conversion dual connector comprising: a first unit serving as an electrical connector element having an insertion hole in a body into which a contact is incorporated, a pin type optical plug and a pin-type electrical plug being selectively insertable into and extractable from said insertion hole, said pin type optical plug holding an end portion of an optical fiber, said pin-type electrical plug having a terminal that is to be connected to said contact; and a second unit serving as a photoelectric conversion connector element comprising a holder which is attachable to and detachable from a rear end portion of said body of said first unit, and which holds a photoelectric conversion device that, in an attached state, is placed coaxially with an optical axis of said optical fiber held by said pin type optical plug inserted into said insertion hole, wherein both said first and second units are formed as surface mounting type units, a first soldering terminal of a surface mount type disposed on said first unit is placed on a side portion of said body, and a second soldering terminal of the surface mount type disposed on said second unit is placed on a rear portion of said holder; and said first unit is a multipolar unit comprising a plurality of contacts and a plurality of said first soldering terminals which are continuous respectively to said contacts, part of said first soldering terminals is placed on one lateral side of said body, and other part of said first soldering terminals is placed on another lateral side of said body; and said holder comprises a pair of right and left arms which forward protrude to be longitudinally fittable into and extractable from said rear end portion of said body, and which, in a fitted state, overlap with right and left outer side faces of said rear end portion of said body, respectively, front end portions of said arms respectively comprise engaging claws which are to be engaged with engagement steps formed on right and left outer side faces of said body, to cooperate with a front end face of said holder to clampingly hold said rear end portion of said body, and a positioning protrusion is disposed integrally on said holder, said positioning protrusion being to be inserted into a recess formed in said rear end portion of said body to overlap with upper and lower wall faces of said recess, thereby restricting a level position of said second unit with respect to said first unit to make a level of a lower face of said second soldering terminal coincident with levels of lower faces of said first soldering terminals.

5. An electrical/photoelectric conversion dual connector according to claim 4, wherein two or right and left portions of a wall face of said insertion hole in said rear end portion of said body are removed away, said recess is disposed in said rear end portion of said body and outside one of said removed portions with facing said one removed portion, another recess is disposed in said rear end portion of said body and outside another one of said removed portions with facing said other removed portion, said holder comprises an auxiliary protrusion which is to be inserted into said other recess to laterally oppose said positioning protrusion inserted into said recess, across said insertion hole, and each of said positioning and auxiliary protrusions comprises an arcuately curved face which forms a part of said wall face of said insertion hole in corresponding one of said removed portions.

6. An electrical/photoelectric conversion dual connector according to claim 5, wherein said first unit comprises an odd number of first soldering terminals, said soldering terminals are classified into an even number of first soldering terminals and one first soldering terminal, said one first soldering terminal comprises a plate-like rising piece, and placed on a projection piece which rearward protrudes from one lateral side of said rear end portion of said body, said rising piece overlaps with an inner side of said projection piece, said even number of first soldering terminals are distributed by a same number to lateral sides of said body, and, when said second unit is attached to said first unit, an overlapping portion of said projection piece and said rising piece is fitted into a recess formed in an inner side of one of said arms of said holder.

* * * * *